(12) United States Patent
Du et al.

(10) Patent No.: US 10,484,272 B2
(45) Date of Patent: Nov. 19, 2019

(54) PACKET FORWARDING IN RPR NETWORK

(71) Applicant: HEWLETT PACKARD ENTERPRISE DEVELOPMENT LP, Houston, TX (US)

(72) Inventors: Wenjun Du, Beijing (CN); Zhixin Xiong, Beijing (CN); Jiabing Wang, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 15/505,413

(22) PCT Filed: Aug. 18, 2015

(86) PCT No.: PCT/CN2015/087317
§ 371 (c)(1),
(2) Date: Feb. 21, 2017

(87) PCT Pub. No.: WO2016/026418
PCT Pub. Date: Feb. 25, 2016

(65) Prior Publication Data
US 2017/0264534 A1    Sep. 14, 2017

(30) Foreign Application Priority Data

Aug. 20, 2014   (CN) .......................... 2014 1 0411423

(51) Int. Cl.
*H04L 12/721* (2013.01)
*H04L 12/437* (2006.01)
(Continued)

(52) U.S. Cl.
CPC .............. *H04L 45/32* (2013.01); *H04J 3/085* (2013.01); *H04J 14/0287* (2013.01);
(Continued)

(58) Field of Classification Search
CPC ....... H04L 45/00; H04L 47/10; H04L 49/351; H04L 29/0653; H04L 29/06
See application file for complete search history.

(56) References Cited

U.S. PATENT DOCUMENTS

| 6,247,058 B1 | 6/2001 | Miller et al. |
| 2003/0074469 A1* | 4/2003 | Busi .................... H04L 12/4625 709/238 |

(Continued)

FOREIGN PATENT DOCUMENTS

| CN | 1691628 | 11/2005 |
| CN | 1859289 | 11/2006 |

(Continued)

OTHER PUBLICATIONS

International Searching Authority, "Notification of Transmittal of the IUnternational Search Report and the Written Opinion", PCT/CN2015/087317, dated Nov. 27, 2015, 7 pages.

(Continued)

*Primary Examiner* — Gbemileke J Onamuti
*Assistant Examiner* — Sanjay K Dewan

(57) ABSTRACT

A network device in a RPR network receives a RPR flooding data packet sent by another network device in the RPR network, determines whether a next-hop network device of the RPR flooding data packet is a source network device sending the RPR flooding data packet, and strips the RPR flooding data packet when determining that the next-hop network device of the RPR flooding data packet is the source network device sending the RPR flooding data packet.

9 Claims, 4 Drawing Sheets

(51) Int. Cl.
*H04L 12/741* (2013.01)
*H04Q 11/00* (2006.01)
*H04J 3/08* (2006.01)
*H04J 14/02* (2006.01)

(52) U.S. Cl.
CPC ............ *H04L 12/437* (2013.01); *H04L 45/66* (2013.01); *H04L 45/745* (2013.01); *H04Q 11/0066* (2013.01); *H04Q 2011/0016* (2013.01); *H04Q 2011/0073* (2013.01); *H04Q 2011/0081* (2013.01); *H04Q 2011/0092* (2013.01)

(56) References Cited

U.S. PATENT DOCUMENTS

| | | | | |
|---|---|---|---|---|
| 2003/0118041 A1* | 6/2003 | Fontana | ............. | H04L 12/4637 370/404 |
| 2005/0243845 A1* | 11/2005 | Higashitaniguchi | ........................ | H04L 12/437 370/404 |
| 2006/0056425 A1* | 3/2006 | Wu | ....................... | H04L 12/433 370/401 |
| 2007/0081535 A1* | 4/2007 | Li | ........................ | H04L 12/433 370/392 |
| 2007/0263660 A1* | 11/2007 | Mitsumori | .............. | H04L 12/42 370/469 |
| 2008/0031247 A1* | 2/2008 | Tahara | ................ | H04L 12/1886 370/390 |
| 2008/0118244 A1* | 5/2008 | Nakada | ..................... | H04J 3/14 398/59 |
| 2008/0240007 A1* | 10/2008 | Tsuchiya | ................. | H04L 12/42 370/310 |
| 2008/0316918 A1* | 12/2008 | Sakauchi | .............. | H04L 12/437 370/223 |
| 2009/0003199 A1* | 1/2009 | Sugawara | ........... | H04L 12/4637 370/223 |
| 2010/0098071 A1* | 4/2010 | Zhang | ..................... | H04L 12/42 370/389 |
| 2010/0309776 A1* | 12/2010 | Alharbi | .................. | H04L 12/42 370/216 |
| 2013/0336315 A1* | 12/2013 | Guichard | .......... | H04L 12/4645 370/389 |

FOREIGN PATENT DOCUMENTS

| | | | | |
|---|---|---|---|---|
| CN | 101159713 A | | 4/2008 | |
| CN | 101321133 | | 12/2008 | |
| CN | 101321133 A | * | 12/2008 | ............. H04L 12/42 |
| CN | 101582857 A | | 11/2009 | |
| CN | 102088417 A | | 6/2011 | |
| CN | 103368844 A | | 10/2013 | |
| WO | WO-2008156545 | | 12/2008 | |

OTHER PUBLICATIONS

International Preliminary Report on Patentability received for PCT Patent Application No. PCT/CN2015/087317, dated Mar. 2, 2017, 5 pages.

* cited by examiner

PACKET FORWARDING IN RPR NETWORK

BACKGROUND

Resilient Packet Ring (RPR) is a new Media Access Control (MAC) protocol, and may be run in a Synchronous Optical Network (SONET)/Synchronous Digital Hierarchy (SDH), Dense Wavelength Division Multiplexing (DWDM) and an Ethernet. The RPR may provide a flexible and effective networking solution for broadband Internet Protocol (IP) Metropolitan Area Network operators.

BRIEF DESCRIPTION OF THE DRAWINGS

Features of the present disclosure are illustrated by way of example and not limited in the following figure(s), in which like numerals indicate like elements, in which.

DETAILED DESCRIPTION

For simplicity and illustrative purposes, the present disclosure is described by referring mainly to an example thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. Throughout the present disclosure, the terms "a" and "an" are intended to denote at least one of a particular element. As used herein, the term "includes" means includes but not limited to, the term "including" means including but not limited to. The term "based on" means based at least in part on.

Figure 1:
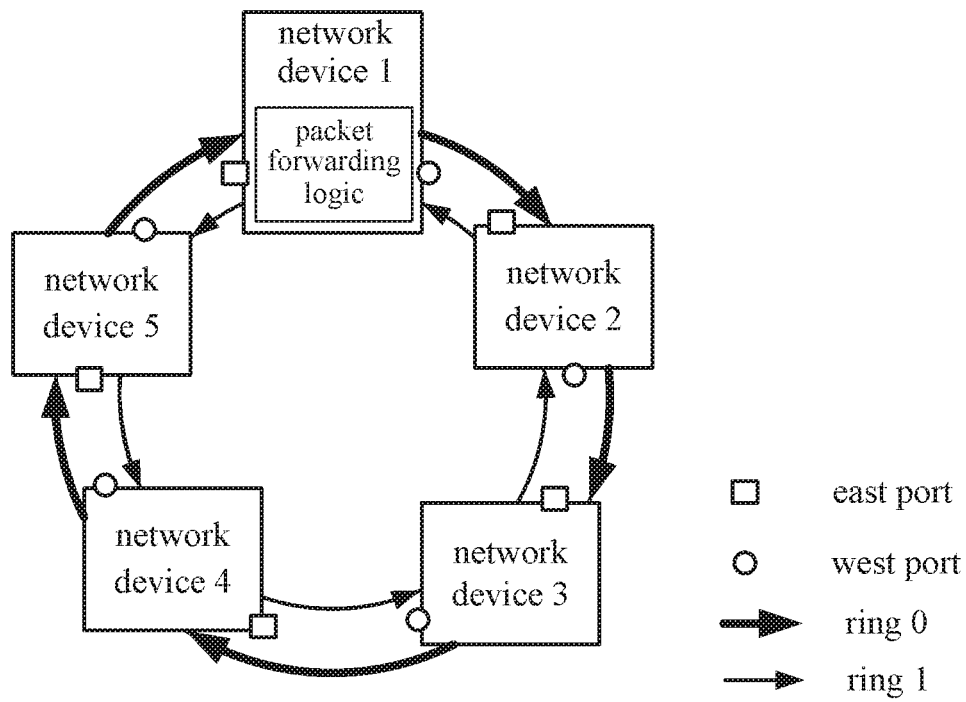
FIG. 1 is a diagram illustrating the structure of a RPR network according to an example of the present disclosure.

FIG. 1 is a diagram illustrating the structure of a RPR network according to an example of the present disclosure. As shown in FIG. 1, the RPR network has a reverse double-ring structure, and data is forwarded among network devices along the RPR network. Some terms relating to the RPR network are described hereinafter.

Ring 0 refers to a ring on which packets are sent clockwise. The ring 0 is also called an outer ring.

Ring 1 refers to a ring on which packets are sent anti-clockwise. The ring 1 is also called an inner ring.

A station refers to a network device in the RPR network. The station may receive and send packets.

A link refers to a transmission channel between two adjacent network devices. Two adjacent network devices are connected through two links with an opposite direction.

A span refers to a link between two adjacent network devices in the RPR network. The span includes two links with an opposition direction.

A domain is composed of multiple continuous spans and network devices on the spans.

A west port refers to a physical port which receives a packet on the ring 0 and sends a packet on the ring 1.

An east port refers to a physical port which sends a packet on the ring 0 and receives a packet on the ring 1.

An edge refers to a span which cannot forward packets when the span or a network device adjacent to the span is failed.

Ring states include an open-loop state and a closed-loop state. A ring having no edge is called a closed loop, and a ring having an edge is called an open loop. Broadcast data packets, multicast data packets and unicast data packets having unknown destination addresses are flooded unidirectionally on the closed loop, and are flooded bidirectionally on the open loop.

The term "insert" refers to that a network device inserts a packet into a data flow in the RPR network after encapsulating a RPR header into the packet. That is, the network device forwards the encapsulated packet along the ring 0 and/or the ring 1.

The term of "transit" refers to that a network device forwards a packet received in the RPR network to a next network device.

The term of "copy" refers to that a network device copies a packet received in the RPR network and sends the copied packet to an upper layer of the network device to be processed. The copy operation does not terminate the forwarding of the packet in the RPR network.

The term of "strip" refers to that a network device terminates the forwarding of a packet in the RPR network, and strips the packet from the RPR network. In other words, the network device discards the packet received in the RPR network.

Each network device performs forwarding processing for packets through one or more of an insert operation, a transit operation, a copy operation and a strip operation.

When a RPR flooding data packet is to be forwarded in the RPR network, the RPR flooding data packet is sent from a source network device, and returned to the source network device after being forwarded in turn by network devices in the RPR network. However, the source network device will discard the RPR flooding data packet sent by it. Accordingly, it is redundant to forward the RPR flooding data packet to the source network device by a last-hop network device of the source network device in the RPR network. The redundant forwarding operation not only increases the working load of the last-hop network device, but also wastes link bandwidth between the source network device and the last-hop network device.

For example, as shown in FIG. 1, a RPR flooding data packet sent by a network device 1 via an east port passes through a network device 2, a network device 3, a network device 4 and a network device 5 in turn along the ring 0, and finally returns to the network device 1. It is redundant to forward the RPR flooding data packet to the network device 1 by the last-hop network device (i.e., the network device 5) of the network device 1 on the ring 0.

An example of the present disclosure provides a packet forwarding method in the RPR network and an apparatus to which the packet forwarding method is applied. The packet forwarding method may also be called a packet forwarding logic.

Figure 2:
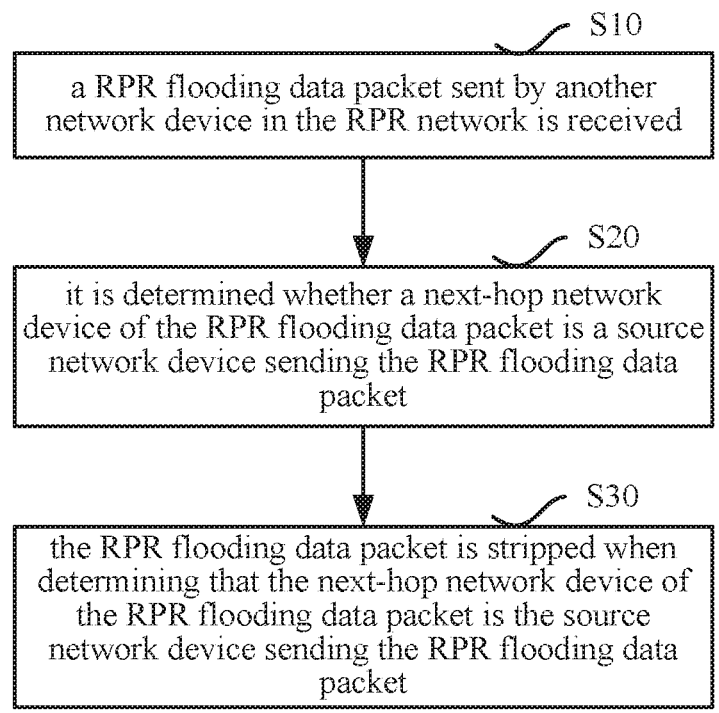
FIG. 2 is a flowchart illustrating a packet forwarding method in a RPR network according to an example of the present disclosure.

FIG. 2 is a flowchart illustrating a packet forwarding method in a RPR network according to an example of the present disclosure. The packet forwarding method may be applied to a network device in the RPR network. As shown in FIG. 2, the method includes following blocks.

At block S10, a RPR flooding data packet sent by another network device in the RPR network is received.

At block S20, it is determined whether a next-hop network device of the RPR flooding data packet is a source network device sending the RPR flooding data packet.

At block S30, the RPR flooding data packet is stripped when determining that the next-hop network device of the RPR flooding data packet is the source network device sending the RPR flooding data packet.

In the packet forwarding method provided by the example of the present disclosure, the source network device performs RPR encapsulation for a flooding data packet such as a broadcast data packet, a multicast data packet or a unicast data packet having an unknown destination address to generate a RPR flooding packet, set a TTL value as the maximum number of network devices supported by the RPR network or as the number of network devices in the RPR network subtracted by 1, and then sends out the RPR flooding data packet. After receiving the RPR flooding data packet, each of other network devices except the source network device determines whether the next-hop network device of the RPR flooding data packet is the source network device sending the RPR flooding data packet and whether the TTL value of the RPR flooding data packet is larger than 1. When determining that the next-hop network device of the RPR flooding data packet is the source network device sending the RPR flooding data packet or the TTL value of the RPR flooding data packet is not larger than 1, the network device strips the RPR flooding data packet, i.e., discards the RPR flooding data packet. When determining that the next-hop network device of the RPR flooding data packet is not the source network device sending the RPR flooding data packet and the TTL value of the RPR flooding data packet is larger than 1, the network device transits the RPR flooding data packet, i.e., subtracts 1 from the TTL value and forwards the RPR flooding data packet to the next-hop network device of the RPR flooding data packet. After receiving the RPR flooding data packet, the last-hop network device of the source network device in the RPR network does not forward the RPR flooding data packet to the source network device. Accordingly, not only the working load of the last-hop network device of the source network device is decreased, but also link bandwidth between the source network device and the last-hop network device of the source network device is saved.

When performing RPR encapsulation for a flooding data packet, the source network device may set the TTL value as the maximum number of network devices supported by the RPR network or as the number of network devices in the RPR network subtracted by 1. The packet forwarding method will be illustrated hereinafter when the TTL value is set as any one of the two values.

In an example, when the TTL value is set as the maximum number of network devices supported by the RPR network, the packet forwarding method in the RPR network is implemented as follows.

The source network device performs RPR encapsulation for a flooding data packet such as a broadcast data packet, a multicast data packet or a unicast data packet having an unknown destination address to generate a RPR flooding data packet, sets a TTL value contained in a RPR header as the maximum number of network devices supported by the RPR network, and then sends out the RPR flooding data packet. For example, the maximum number of network devices supported by the RPR network may be 255. In an example, the source network device forwards the RPR flooding data packet via an east port along a ring 0, or forwards the RPR flooding data packet via a west port along a ring 1. Besides the TTL value, the RPR header also contains a flag bit for indicating that the encapsulated flooding data packet is the RPR flooding data packet and a flag bit for indicating that the RPR flooding data packet is forwarded along the ring 0 or the ring 1.

Figure 3:
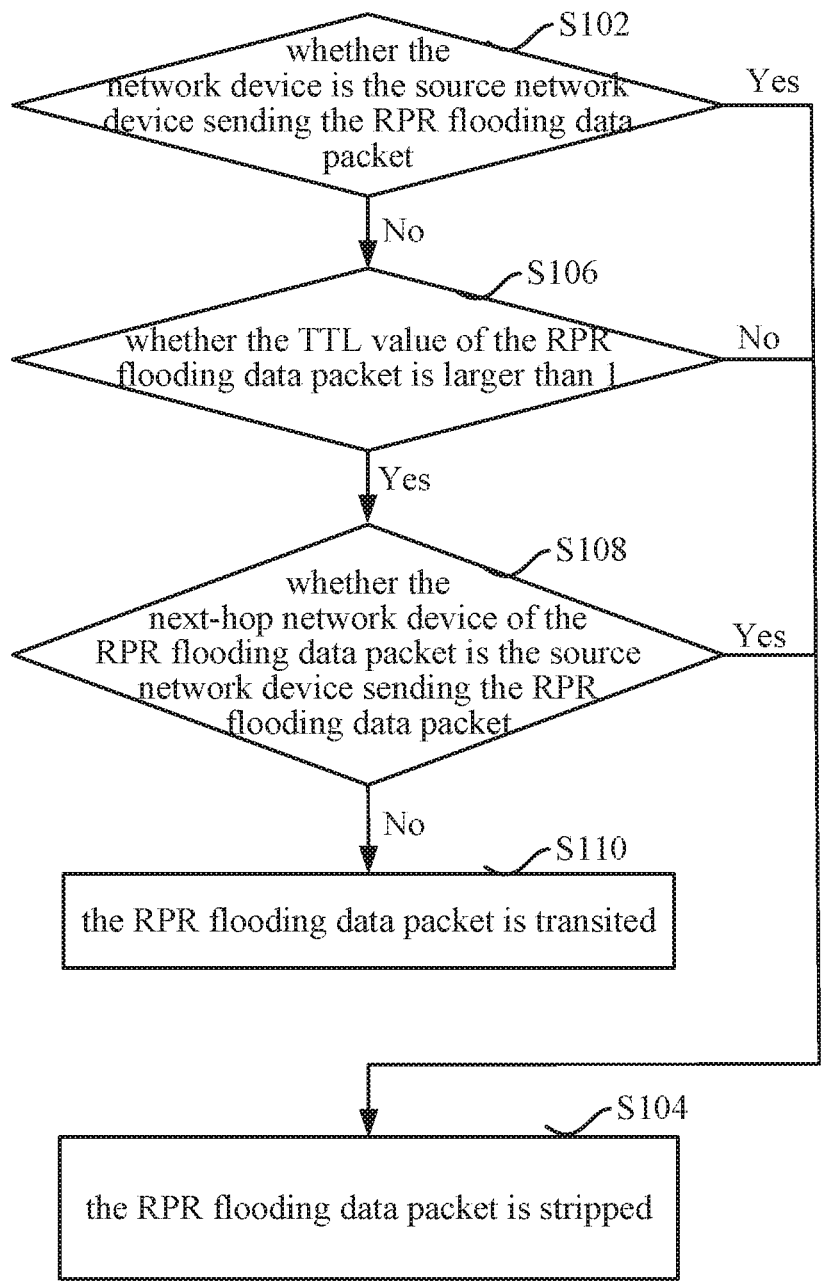
FIG. 3 is a flowchart illustrating operations performed by a network device in a RPR network after receiving a RPR flooding data packet, where a Time To Live (TTL) value is set as the maximum number of network devices supported by the RPR network.

After receiving the RPR flooding data packet, a network device performs following operations, as shown in FIG. 3.

At block S102, it is determined whether the network device is the source network device sending the RPR flooding data packet. If the network device is the source network device sending the RPR flooding data packet, block S104 is performed; otherwise, block S106 is performed.

In an example, block S102 includes: determining whether the source MAC address of the RPR flooding data packet is the MAC address of the network device; if the source MAC address of the RPR flooding data packet is the MAC address of the network device, determining that the network device is the source network device sending the RPR flooding data packet; otherwise, determining that the network device is not the source network device sending the RPR flooding data packet.

At block S104, the RPR flooding data packet is stripped. In other words, the RPR flooding data packet is discarded.

At block S106, it is determined whether the TTL value of the RPR flooding data packet is larger than 1. If the TTL value of the RPR flooding data packet is not larger than 1, block S104 is performed; if the TTL value of the RPR flooding data packet is larger than 1, block S108 is performed.

In an example, the RPR flooding data packet is also copied at block S106. In other words, the RPR flooding data packet is sent to an upper layer of the network device to be processed.

At block S108, it is determined whether the next-hop network device of the RPR flooding data packet is the source network device sending the RPR flooding data packet. If the next-hop network device of the RPR flooding data packet is the source network device sending the RPR flooding data packet, block S104 is performed; otherwise, block S110 is performed.

In an example, since the RPR header of the RPR flooding data packet contains the flag bit for indicating that the RPR flooding data packet is forwarded along the ring 0 or the ring 1, at block S108, the next-hop network device of the network device on the ring (the ring 0 or the ring 1) indicated by the flag bit may be determined in a local ring network topology table. The next-hop network device is the next-hop network device of the RPR flooding data packet. Then, the network device determines whether the MAC address of the next-hop network device is the source MAC address of the RPR flooding data packet. If the MAC address of the next-hop network device is the source MAC address of the RPR flooding data packet, it is determined that the next-hop network device of the RPR flooding data packet is the source network device sending the RPR flooding data packet. Otherwise, it is determined that the next-hop network device of the RPR flooding data packet is not the source network device sending the RPR flooding data packet.

At block S110, the RPR flooding data packet is transited. In other words, the RPR flooding data packet is forwarded to the next-hop network device of the RPR flooding data packet after the TTL value of the RPR flooding data packet is subtracted by 1.

In this example, the source network device sends the RPR flooding data packet into which a broadcast data packet, a multicast data packet or a unicast data packet having an unknown destination address is encapsulated and whose TTL value is the maximum number of network devices supported by the RPR network. When the RPR flooding data packet reaches the last-hop network device of the source network device after being forwarded in turn by network devices on the ring 0 or the ring 1, the last-hop network device of the source network device may determine, according to the method described at blocks S102-S110, that the next-hop network device of the RPR flooding data packet is the source network device sending the RPR flooding data packet, and thus discards the RPR flooding data packet. The last-hop network device of the source network device does not forward the RPR flooding data packet to the source network device again. Accordingly, not only the working load of the last-hop network device of the source network device is decreased, but also link bandwidth between the source network device and the last-hop network device of the source network device is saved.

In an example, when the TTL value is set as the number of network devices in the RPR network subtracted by 1, the packet forwarding method in the RPR network is implemented as follows.

The source network device performs RPR encapsulation for a flooding data packet such as a broadcast data packet, a multicast data packet or a unicast data packet having an unknown destination address to generate a RPR flooding data packet, sets a TTL value contained in a RPR header as the number of network devices in the RPR network subtracted by 1, and then sends out the RPR flooding data packet. For example, the source network device forwards the RPR flooding data packet via an east port along the ring 0, or forwards the RPR flooding data packet via a west port along the ring 1. Suppose the number of network devices in the RPR network is N, the TTL value of the RPR flooding data packet is N−1. Besides the TTL value, the RPR header also contains a flag bit for indicating that the encapsulated flooding data packet is the RPR flooding data packet and a flag bit for indicating that the RPR flooding data packet is forwarded along the ring 0 or the ring 1.

Figure 4:
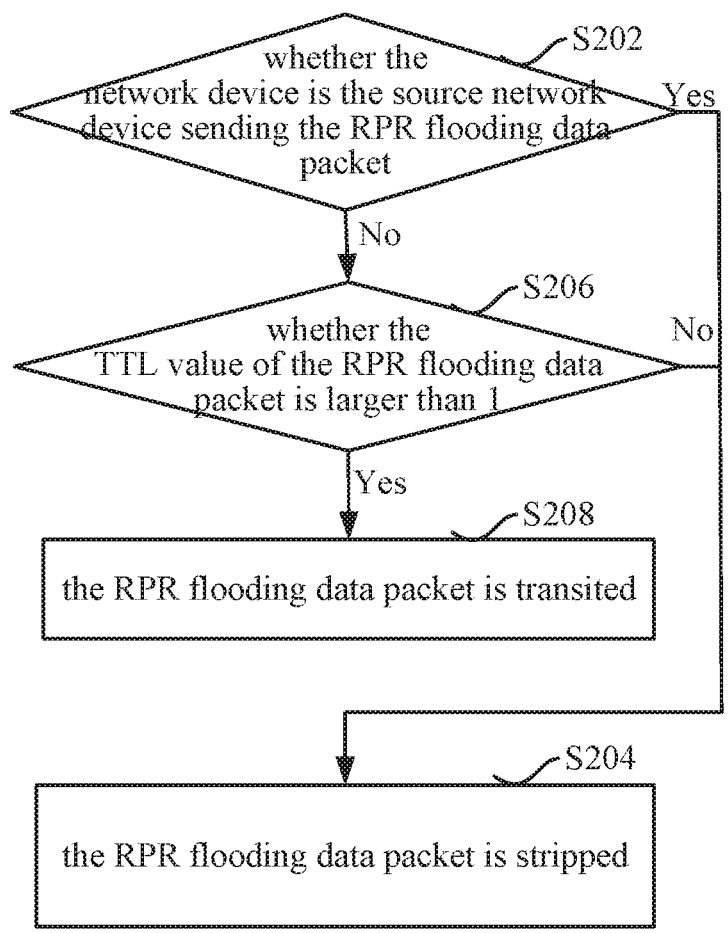
FIG. 4 is a flowchart illustrating operations performed by a network device in a RPR network after receiving a RPR flooding data packet, where a TTL value is set as the number of network devices in the RPR network subtracted by 1.

After receiving the RPR flooding data packet, a network device performs the above mentioned blocks S102-S110, and further performs following operations shown in FIG. 4.

At block S202, it is determined whether the network device is the source network device sending the RPR flooding data packet. If the network device is the source network device sending the RPR flooding data packet, block S204 is performed; otherwise, block S206 is performed.

In an example, block S202 includes: determining whether the source MAC address of the RPR flooding data packet is the MAC address of the network device; if the source MAC address of the RPR flooding data packet is the MAC address of the network device, determining that the network device is the source network device sending the RPR flooding data packet; otherwise, determining that the network device is not the source network device sending the RPR flooding data packet.

At block S204, the RPR flooding data packet is stripped. In other words, the RPR flooding data packet is discarded.

At block S206, it is determined whether the TTL value of the RPR flooding data packet is larger than 1. If the TTL value of the RPR flooding data packet is not larger than 1, block S204 is performed. If the TTL value of the RPR flooding data packet is larger than 1, block S208 is performed.

In an example, the RPR flooding data packet is also copied at block S206. In other words, the RPR flooding data packet is sent to an upper layer of the network device to be processed.

At block S208, the RPR flooding data packet is transited. In other words, the RPR flooding data packet is forwarded to the next-hop network device of the RPR flooding data packet after the TTL value of the RPR flooding data packet is subtracted by 1.

In this example, the source network device sends the RPR flooding data packet into which a broadcast data packet, a multicast data packet or a unicast data packet having an unknown destination address is encapsulated and whose TTL value is the number of network devices in the RPR network subtracted by 1. When the RPR flooding data packet reaches the last-hop network device of the source network device after being forwarded in turn by network devices on the ring 0 or the ring 1, the last-hop network device of the source network device may determine, according to the method described at blocks S102-S110, that the next-hop network device of the RPR flooding data packet is the source network device sending the RPR flooding data packet, and thus discards the RPR flooding data packet. Or, the last-hop network device of the source network device may determine, according to the method described at blocks S202-S208, that the TTL value of the RPR flooding data packet is not larger than 1, and thus discards RPR flooding data packet. The last-hop network device of the source network device does not forward the RPR flooding data packet to the source network device again. Accordingly, not only the working load of the last-hop network device of the source network device is decreased, but also link bandwidth between the source network device and the last-hop network device of the source network device is saved.

Based on the RPR network shown in FIG. 1, the packet forwarding method will be illustrated hereinafter. As shown in FIG. 1, the RPR network includes five network devices, called network devices 1 to 5 respectively. A ring on which a forwarding direction of packets is network device 1→network device 2→network device 3→network device 4→network device 5→network device 1 is called ring 0, and a ring on which a forwarding direction of packets is network device 1→network device 5→network device 4→network device 3→network device 2→network device 1 is called ring 1. The MAC address of the network device 1 is MAC1, the MAC address of the network device 2 is MAC2, and the like.

In an example, a TTL value is set as the maximum number of network devices supported by the RPR network, for example, the maximum number of network devices supported by the RPR network is 255, and the packet forwarding method is implemented as follows.

The network device 1 encapsulates a RPR header for a broadcast data packet and sets the TTL value as 255 to generate a RPR flooding data packet. The source MAC address of the RPR flooding data packet is MAC1, and the RPR flooding data packet contains a flag bit for indicating that the RPR flooding data packet is forwarded along the ring 0. Afterwards, the network device 1 forwards the RPR flooding data packet via an east port. In other words, the network device 1 forwards the RPR flooding data packet to the network device 2 along the ring 0.

After receiving the RPR flooding data packet, the network device 2 determines that the source MAC address of the RPR flooding data packet is MAC1 instead of the MAC address of the network device 2. The network device 2 copies the RPR flooding data packet and determines whether the TTL value of the RPR flooding data packet is larger than 1. If the TTL value of the RPR flooding data packet is not larger than 1, the network device 2 strips the RPR flooding data packet. If the TTL value of the RPR flooding data packet is larger than 1, the network device 2 finds, in a local ring network topology table according to a flag bit contained in the RPR flooding data packet, that the next-hop network device of the network device 2 on the ring 0 is the network device 3, where the flag bit may indicate that the RPR flooding data packet is forwarded along the ring 0. In other words, the next-hop network device of the RPR flooding data packet is the network device 3. The network device 2 determines whether the MAC address of the network device 3. i.e., MAC3, is the source MAC address of the RPR flooding data packet. When determining that the MAC address of the network device 3 is not the source MAC address of the RPR flooding data packet, the network device 2 transits the RPR flooding data packet. That is, the network device 2 forwards the RPR flooding data packet via the east port after the TTL value is subtracted by 1. In other words, the network device 2 forwards the RPR flooding data packet to the network device 3 along the ring 0.

After receiving the RPR flooding data packet, the network device 3 determines that the source MAC address of the RPR flooding data packet is MAC1 instead of the MAC address of the network device 3. The network device 3 copies the RPR flooding data packet and determines whether the TTL value of the RPR flooding data packet is larger than 1. If the TTL value of the RPR flooding data packet is not larger than 1, the network device 3 strips the RPR flooding data packet. If the TTL value of the RPR flooding data packet is larger than 1, the network device 3 finds, in a local ring network topology table according to a flag bit contained in the RPR flooding data packet, that the next-hop network device of the network device 3 on the ring 0 is the network device 4, where the flag bit may indicate that the RPR flooding data packet is forwarded along the ring 0. In other words, the next-hop network device of the RPR flooding data packet is the network device 4. The network device 3 determines whether the MAC address of the network device 4, i.e., MAC4, is the source MAC address of the RPR flooding data packet. When determining that the MAC address of the network device 4 is not the source MAC address of the RPR flooding data packet, the network device 3 transits the RPR flooding data packet. That is, the network device 3 forwards the RPR flooding data packet via the east port after the TTL value is subtracted by 1. In other words, the network device 3 forwards the RPR flooding data packet to the network device 4 along the ring 0.

After receiving the RPR flooding data packet, the network device 4 determines that the source MAC address of the RPR flooding data packet is MAC1 instead of the MAC address of the network device 4. The network device 4 copies the RPR flooding data packet and determines whether the TTL value of the RPR flooding data packet is larger than 1. If the TTL value of the RPR flooding data packet is not larger than 1, the network device 4 strips the RPR flooding data packet. If the TTL value of the RPR flooding data packet is larger than 1, the network device 4 finds, in a local ring network topology table according to a flag bit contained in the RPR flooding data packet, that the next-hop network device of the network device 4 on the ring 0 is the network device 5, where the flag bit may indicate that the RPR flooding data packet is forwarded along the ring 0. In other words, the next-hop network device of the RPR flooding data packet is the network device 5. The network device 4 determines whether the MAC address of the network device 5, i.e., MAC5, is the source MAC address of the RPR flooding data packet. When determining that the MAC address of the network device 5 is not the source MAC address of the RPR flooding data packet, the network device 4 transits the RPR flooding data packet. That is, the network device 4 forwards the RPR flooding data packet via the east port after the TTL value is subtracted by 1. In other words, the network device 4 forwards the RPR flooding data packet to the network device 5 along the ring 0.

After receiving the RPR flooding data packet, the network device 5 determines that the source MAC address of the RPR flooding data packet is MAC1 instead of the MAC address of the network device 5. The network device 5 copies the RPR flooding data packet and determines whether the TTL value of the RPR flooding data packet is larger than 1. If the TTL value of the RPR flooding data packet is not larger than 1, the network device 5 strips the RPR flooding data packet. If the TTL value of the RPR flooding data packet is larger than 1, the network device 5 finds, in a local ring network topology table according to a flag bit contained in the RPR flooding data packet, that the next-hop network device of the network device 5 on the ring 0 is the network device 1, where the flag bit may indicate that the RPR flooding data packet is forwarded along the ring 0. In other words, the next-hop network device of the RPR flooding data packet is the network device 1. The network device 5 determines whether the MAC address of the network device 1, i.e., MAC1, is the source MAC address of the RPR flooding data packet. When determining that the MAC address of the network device 5 is the source MAC address of the RPR flooding data packet, the network device 5 strips the RPR flooding data packet. That is, the network device 5 discards the RPR flooding data packet.

Accordingly, the RPR flooding data packet sent by the network device 1 is discarded after being forwarded in turn by network devices on the ring 0 and reaching the network device 5, rather than is forwarded to the network device 1.

In an example, the TTL value is set as the number of network devices in the RPR network subtracted by 1. For example, the number of network devices in the RPR network shown in FIG. 1 is 5, and thus the TTL value is set as 4. The packet forwarding method is implemented as follows.

The network device 1 encapsulates a RPR header for a broadcast data packet and sets the TTL value as 4 to generate a RPR flooding data packet. The source MAC address of the RPR flooding data packet is MAC1, and the RPR flooding data packet contains a flag bit for indicating that the RPR flooding data packet is forwarded along the ring 0. Afterwards, the network device 1 forwards the RPR flooding data packet via the east port. In other words, the network device 1 forwards the RPR flooding data packet to the network device 2 along the ring 0.

After receiving the RPR flooding data packet, the network device 2 determines that the source MAC address of the RPR flooding data packet is MAC1 instead of the MAC address of the network device 2. The network device 2 copies the RPR flooding data packet and determines whether the TTL value of the RPR flooding data packet is larger than 1. At this time, the TTL value of the RPR flooding data packet is equal to 4. When determining that the TTL value of the RPR flooding data packet is larger than 1, the network device 2 transits the RPR flooding data packet. In other words, the network device 2 forwards the RPR flooding data packet via the east port after the TTL value is subtracted by 1. That is, the network device 2 forwards the RPR flooding data packet to the network device 3 along the ring 0. At this time, the TTL value is equal to 3.

After receiving the RPR flooding data packet, the network device 3 determines that the source MAC address of the RPR flooding data packet is MAC1 instead of the MAC address of the network device 3. The network device 3 copies the RPR flooding data packet and determines whether the TTL value of the RPR flooding data packet is larger than 1. At this time, the TTL value of the RPR flooding data packet is equal to 3. When determining that the TTL value of the RPR flooding data packet is larger than 1, the network device 3 transits the RPR flooding data packet. In other words, the network device 3 forwards the RPR flooding data packet via the east port after the TTL value is subtracted by 1. That is, the network device 3 forwards the RPR flooding data packet to the network device 4 along the ring 0. At this time, the TTL value is equal to 2.

After receiving the RPR flooding data packet, the network device 4 determines that the source MAC address of the RPR flooding data packet is MAC1 instead of the MAC address of the network device 4. The network device 4 copies the RPR flooding data packet and determines whether the TTL value of the RPR flooding data packet is larger than 1. At this time, the TTL value of the RPR flooding data packet is equal to 2. When determining that the TTL value of the RPR flooding data packet is larger than 1, the network device 4 transits the RPR flooding data packet. In other words, the network device 3 forwards the RPR flooding data packet via the east port after the ITL value is subtracted by 1. That is, the network device 4 forwards the RPR flooding data packet to the network device 5 along the ring 0. At this time, the TTL value is equal to 1.

After receiving the RPR flooding data packet, the network device 5 determines that the source MAC address of the RPR flooding data packet is MAC1 instead of the MAC address of the network device 5. The network device 5 copies the RPR flooding data packet and determines whether the TTL value of the RPR flooding data packet is larger than 1. At this time, the TTL value of the RPR flooding data packet is equal to 1. When determining that the TTL value of the RPR flooding data packet is not larger than 1, the network device 5 strips the RPR flooding data packet. In other words, the network device 5 discards the RPR flooding data packet.

Accordingly, the RPR flooding data packet sent by the network device 1 is discarded after being forwarded around the ring 0 and reaching the network device 5, rather than is forwarded to the network device 1.

Figure 5:
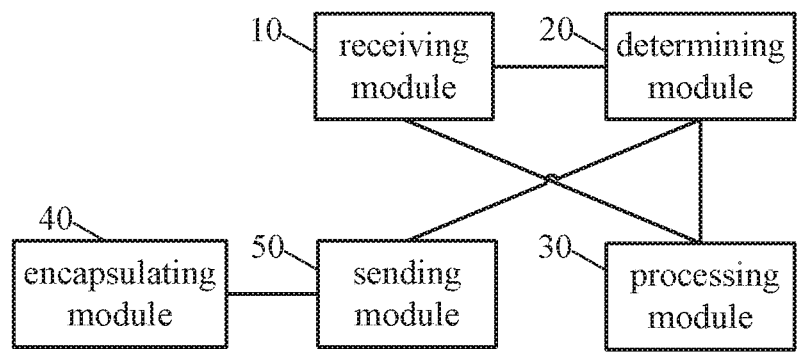
FIG. 5 is a diagram illustrating a structure of a packet forwarding apparatus in a RPR network according to an example of the present disclosure.

FIG. 5 is a diagram illustrating a structure of a packet forwarding apparatus in a RPR network according to an example of the present disclosure. The packet forwarding apparatus includes a receiving module 10, a determining module 20 and a processing module 30.

The receiving module 10 may receive a RPR flooding data packet from another network device in a RPR network.

The determining module 20 may determine whether a next-hop network device of the RPR flooding data packet received by the receiving module 10 is a source network device sending the RPR flooding data packet.

The processing module 30 may strip the RPR flooding data packet when the determining module 20 determines that the next-hop network device of the RPR flooding data packet received by the receiving module 10 is the source network device sending the RPR flooding data packet.

The packet forwarding apparatus may further include an encapsulating module 40 and a sending module 50.

The encapsulating module 40 may perform RPR encapsulation for a flooding data packet and set a TTL value as the number of network devices in the RPR network subtracted by 1 to generate a RPR flooding data packet.

The sending module 50 may forward the RPR flooding data packet generated by the encapsulating module 40.

The determining module 20 may include a first determining unit, a MAC address determining unit and a second determining unit.

The first determining unit may determine a MAC address of the next-hop network device of the RPR flooding data packet received by the receiving module 10 according to a local ring network topology table.

The MAC address determining unit may determine whether the MAC address of the next-hop network device is the source MAC address of the RPR flooding data packet received by the receiving module 10.

When the MAC address determining unit determines that the MAC address of the next-hop network device is the source MAC address of the RPR flooding data packet received by the receiving module 10, the second determining unit determines that the next-hop network device of the RPR flooding data packet is the source network device sending the RPR flooding data packet. Otherwise, the second determining unit determines that the next-hop network device of the RPR flooding data packet is not the source network device sending the RPR flooding data packet.

When the determining module 20 determines that the next-hop network device of the RPR flooding data packet is not the source network device sending the RPR flooding data packet and the TTL value of the RPR flooding data packet is larger than 1, the sending module 50 may transit the RPR flooding data packet.

Figure 6:
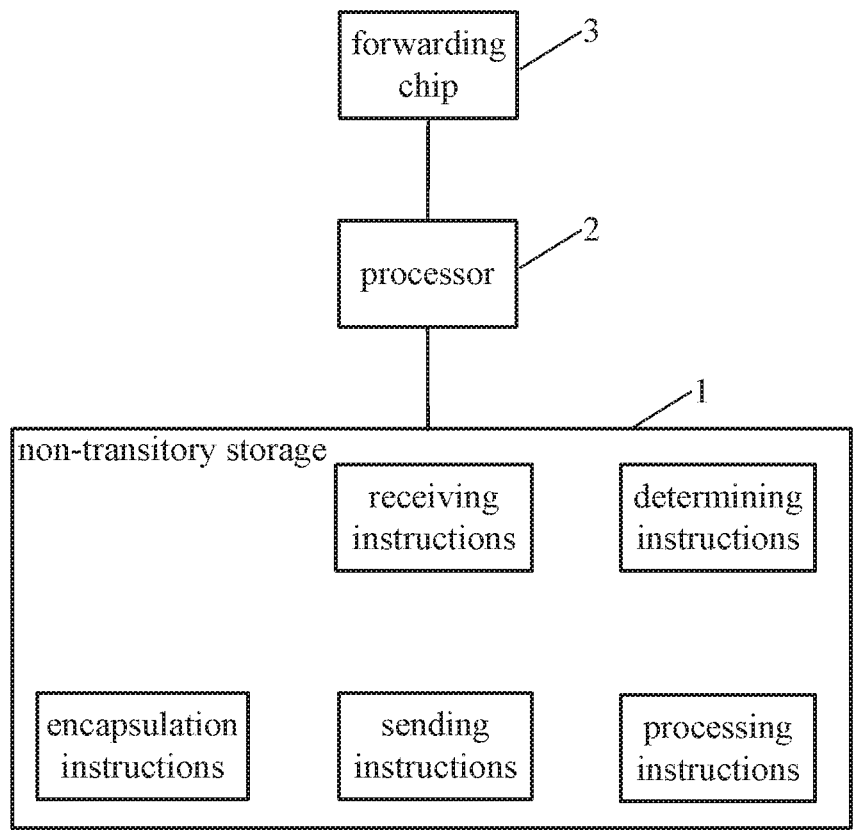
FIG. 6 is a diagram illustrating a hardware structure of a packet forwarding apparatus in a RPR network according to an example of the present disclosure.

FIG. 6 is a diagram illustrating a hardware structure of a packet forwarding apparatus in a RPR network according to an example of the present disclosure. The packet forwarding apparatus includes a non-transitory storage 1, a processor 2 (for example, a CPU) communicating with the non-transitory storage 1, and a forwarding chip 3.

The non-transitory storage 1 may store machine readable instructions, including receiving instructions, determining instructions and processing instructions that can be executed by the processor 2. The non-transitory storage 1 may further store encapsulation instructions and sending instructions, which are all machine readable instructions that can be executed by the processor 2.

The processor 2 may communicate with the forwarding chip 3 to process RPR flooding data packets sent by the forwarding chip 3.

The processor 2 may read the receiving instructions stored in the non-transitory storage 1 to perform a process of: receiving a RPR flooding data packet from another network device in a RPR network.

The processor 2 may read the determining instructions stored in the non-transitory storage 1 to perform a process of: determining whether a next-hop network device of the received RPR flooding data packet is a source network device sending the RPR flooding data packet.

The processor 2 may read the processing instructions stored in the non-transitory storage 1 to perform a process of: striping the received RPR flooding data packet when determining that the next-hop network device of the received RPR flooding data packet is the source network device sending the RPR flooding data packet.

The processor 2 may read the encapsulating instructions stored in the non-transitory storage 1 to perform a process of: performing RPR encapsulation for a flooding data packet and set a TTL value as the number of network devices in the RPR network to generate a RPR flooding data packet.

The processor 2 may read the sending instructions stored in the non-transitory storage 1 to perform a process of: forwarding the generated RPR flooding data packet.

The determining instructions include first determining instructions, MAC address determining instructions and second determining instructions.

The processor 2 may read the first determining instructions stored in the non-transitory storage 1 to perform a process of: determining a MAC address of the next-hop network device of the received RPR flooding data packet according to a local ring network topology table.

The processor 2 may read the MAC address determining instructions stored in the non-transitory storage 1 to perform a process of: determining whether the MAC address of the next-hop network device of the received RPR flooding data packet is the source MAC address of the received RPR flooding data packet.

The processor 2 may read the second determining instructions stored in the non-transitory storage 1 to perform a process of: when determining that the MAC address of the next-hop network device of the received RPR flooding data packet is the source MAC address of the received RPR flooding data packet, determining that the next-hop network device of the received RPR flooding data packet is the source network device sending the RPR flooding data packet; otherwise, determining that the next-hop network device of the received RPR flooding data packet is not the source network device sending the RPR flooding data packet.

The processor 2 may read the sending instructions stored in the non-transitory storage 1 to perform a process of: transiting the received RPR flooding data packet when determining that the next-hop network device of the received RPR flooding data packet is not the source network device sending the RPR flooding data packet and the TTL value of the received RPR flooding data packet is larger than 1.

The forwarding chip 3 may be connected to other network devices in the RPR network through its ports, and receive and send packets. For example, the forwarding chip 3 may send packets received from other network devices in the RPR network to the processor 2, and send packets received from the processor 2 to other network devices in the RPR network.

As a logic apparatus, the above packet forwarding apparatus may be implemented through reading the machine readable instructions stored in the non-transitory storage by the CPU. When the machine readable instructions are executed, the packet forwarding apparatus may perform operations according to the packet forwarding method described in the above examples.

In the solution of the present disclosure, after receiving a RPR flooding data packet, a network device determines whether a next-hop network device of the RPR flooding data packet is a source network device sending the RPR flooding data packet. When determining that a next-hop network device of the RPR flooding data packet is a source network device sending the RPR flooding data packet, the network device strips the RPR flooding data packet, that is, discards the RPR flooding data packet. After the RPR flooding data packet is forwarded in turn by network devices in the RPR network and reaches the last-hop network device of the source network device, the last-hop network device of the source network device does not forward the RPR flooding data packet to the source network device again. Accordingly, not only the working load of the last-hop network device of the source network device is decreased, but also link bandwidth between the source network device and the last-hop network device of the source network device is saved.

Although described specifically throughout the entirety of the instant disclosure, representative examples of the present disclosure have utility over a wide range of applications, and the above discussion is not intended and should not be construed to be limiting, but is offered as an illustrative discussion of aspects of the disclosure.

What has been described and illustrated herein is an example along with some of its variations. The terms, descriptions and figures used herein are set forth by way of illustration only and are not meant as limitations. Many variations are possible within the spirit and scope of the subject matter, which is intended to be defined by the following claims—and their equivalents—in which all terms are meant in their broadest reasonable sense unless otherwise indicated.

What is claimed is:

1. A packet forwarding method in a Resilient Packet Ring (RPR) network, applied to a network device in the RPR network and comprising:
    receiving a RPR flooding data packet sent by another network device in the RPR network;
    determining whether a next-hop network device of the RPR flooding data packet is a source network device sending the RPR flooding data packet;
    stripping the RPR flooding data packet when determining that the next-hop network device of the RPR flooding data packet is the source network device sending the RPR flooding data packet; and
    performing RPR encapsulation for a flooding data packet and setting a Time to Live (TTL) value as the number of network devices in the RPRR network subtracted by 1 to generate a RPR flooding data packet; and
    forwarding the generated RPR flooding data packet.

2. The method of claim 1, wherein determining whether the next-hop network device of the RPR flooding data packet is the source network device sending the RPR flooding data packet comprises:
    determining a Media Access Control (MAC) address of the next-hop network device according to a local ring network topology table;
    determining whether the MAC address of the next-hop network device is a source MAC address of the RPR flooding data packet; and
    determining that the next-hop network device of the RPR flooding data packet is the source network device sending the RPR flooding data packet when determining that the MAC address of the next-hop network device is the source MAC address of the RPR flooding data packet; and determining that the next-hop network device of the RPR flooding data packet is not the source network device sending the RPR flooding data packet when determining that the MAC address of the next-hop network device is not the source MAC address of the RPR flooding data packet.

3. The method of claim 1, after determining whether the next-hop network device of the RPR flooding data packet is the source network device sending the RPR flooding data packet, further comprising:

when determining that the next-hop network device of the RPR flooding data packet is not the source network device sending the RPR flooding data packet and a TTL value of the RPR flooding data packet is larger than 1, transiting the RPR flooding data packet.

4. A packet forwarding apparatus in a Resilient Packet Ring (RPR) network, comprising a processor and a non-transitory storage;
the non-transitory storage is to store machine readable instructions, comprising receiving instructions, determining instructions and processing instructions;
the processor is to read the receiving instructions stored in the non-transitory storage to perform a process of: receiving a RPR flooding data packet from another network device in the RPR network;
the processor is further to read the determining instructions stored in the non-transitory storage to perform a process of: determining whether a next-hop network device of the RPR flooding data packet is a source network device sending the RPR flooding data packet, and determining that the next-hop network device of the RPR flooding data packet is the source network device sending the RPR flooding data packet when determining that the MAC address of the next-hop network device is the source MAC address of the RPR flooding data packet and determining that the next-hop network device of the RPRR flooding data packet is not the source network device sending the RPR flooding data packet when determining that the MAC address of the next-hop network device is not the source MAC address of the RPR flooding data packet; and
the processor is further to read the processing instructions stored in the non-transitory storage to perform a process of: stripping the RPR flooding data packet when the determining that the next-hop network device of the RPR flooding data packet is the source network device sending the RPR flooding data packet.

5. The apparatus of claim 4, wherein the machine readable instructions further comprise encapsulating instructions and sending instructions;
the processor is further to read the encapsulating instructions stored in the non-transitory storage to perform a process of: performing RPR encapsulation for a flooding data packet and setting a Time To Live (TTL) value as the number of network devices in the RPR network to generate a RPR flooding data packet; and
the processor is further to read the sending instructions stored in the non-transitory storage to perform a process of: forwarding the generated RPR flooding data packet.

6. The apparatus of claim 4, wherein the processor is further to read the sending instructions stored in the non-transitory storage to perform a process of: transiting the RPR flooding data packet when determining that the next-hop network device of the RPR flooding data packet is not the source network device sending the RPR flooding data packet and a TTL value of the RPR flooding data packet is larger than 1.

7. A non-transitory computer-readable medium containing instructions to direct a processor to:
determine whether a next-hop network device of a received RPR flooding data packet is a source network device sending the RPR flooding data packet;
strip the RPR flooding data packet when determining that the next-hop network device of the RPR flooding data packet is the source network device sending the RPR flooding data packet; and
perform RPR encapsulation for a flooding data packet and setting a Time To Live (TTL) value as the number of network devices in the RPR network subtracted by 1 to generate a RPR flooding data packet; and
forward the generated RPR flooding data packet.

8. The medium of claim 7, wherein to determine whether the next-hop network device of the RPR flooding data packet is the source network device sending the RPR flooding data packet, the instructions are to further direct the processor to:
determine a Media Access Control (MAC) address of the next-hop network device according to a local ring network topology table;
determine whether the MAC address of the next-hop network device is a source MAC address of the RPR flooding data packet; and
determine that the next-hop network device of the RPR flooding data packet is the source network device sending the RPR flooding data packet when determining that the MAC address of the next-hop network device is the source MAC address of the RPR flooding data packet; and determining that the next-hop network device of the RPR flooding data packet is not the source network device sending the RPR flooding data packet when determining that the MAC address of the next-hop network device is not the source MAC address of the RPR flooding data packet.

9. The medium of claim 7, wherein after determining whether the next-hop network device of the RPR flooding data packet is the source network device sending the RPR flooding data packet, the instructions are to direct the processor to:
determine whether the next-hop network device of the RPR flooding data packet is not the source network device sending the RPR flooding data packet and a TTL value of the RPR flooding data packet is larger than 1; and
transit the RPR flooding data packet.

* * * * *